United States Patent [19]
Reese

[11] 3,882,798
[45] May 13, 1975

[54] SECONDARY BED ELUTRIATION ARRESTOR FOR A FLUID BED DISPOSAL METHOD AND APPARATUS

[75] Inventor: Richard G. Reese, Woodside, Calif.

[73] Assignee: Combustion Power Company, Inc., Menlo Park, Calif.

[22] Filed: June 24, 1974

[21] Appl. No.: 482,620

Related U.S. Application Data

[63] Continuation-in-part of Ser. No. 247,829, April 26, 1972, Pat. No. 3,818,846.

[52] U.S. Cl. .............. 110/8 F; 110/28 J; 34/57 A; 432/58
[51] Int. Cl. ............................................. F23g 5/00
[58] Field of Search............ 432/58; 34/57 R, 57 A; 110/7 R, 8 R, 8 F, 28 J

[56] References Cited
UNITED STATES PATENTS

| | | |
|---|---|---|
| 3,306,236 | 2/1967 | Campbell ........................ 110/8 F |
| 3,366,080 | 1/1968 | Albertson ....................... 110/8 F |
| 3,589,313 | 6/1971 | Smith et al. .................... 110/8 F |

Primary Examiner—Kenneth W. Sprague
Attorney, Agent, or Firm—Limbach, Limbach & Sutton

[57] ABSTRACT

A fluid bed disposal method and apparatus are disclosed including a secondary bed/elutriation arrestor obstruction of labyrinth construction in the fluid bed reactor having lower and upper vertically spaced-apart perforate retention plates between which are positioned at least first and second vertically spaced-apart grates with the grate bars of the grates staggered with respect to one another. The lower surface of the bars of the lower perforate plate is disclosed as stepped between at least two horizontal surface locations. At least two fluid bed/elutriation arrestor labyrinth obstructions spaced apart above the bed of granular material are disclosed.

5 Claims, 4 Drawing Figures

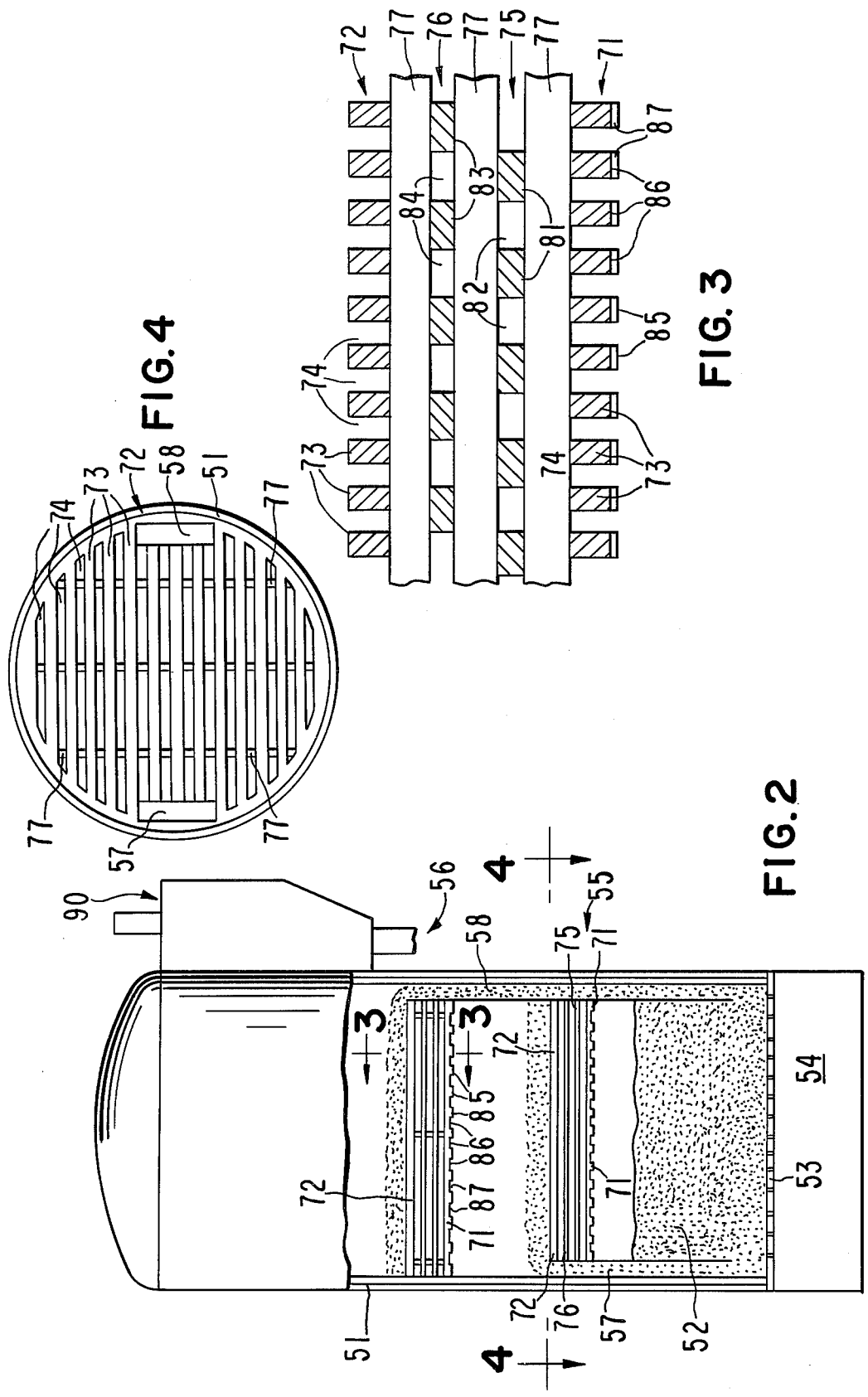

SECONDARY BED ELUTRIATION ARRESTOR FOR A FLUID BED DISPOSAL METHOD AND APPARATUS

BACKGROUND OF THE INVENTION

The present invention is directed to secondary bed-/elutriation arrestors for a fluid bed disposal method and apparatus. The present application is a continuation-in-part of my copending application Ser. No. 247,829 filed Apr. 26, 1972, now U.S. Pat. No. 3,818,846 issued June 25, 1974, the full disclosure of which is hereby incorporated herein by reference.

Fluid bed reactor systems incorporating a fluidized bed of granular particles for thermal or chemical reaction have been known in the past. One such fluid bed reactor system is described in U.S. Pat. No. 3,589,313 to Smith et al. A problem with such systems in the past designed for the disposal of solid waste has been the achievement of complete combustion without afterburning, production of unburned hydrocarbons and incomplete thermal breakdown of toxic material which results in combustion gases leaving the combustion zone and containing undesired air pollutants.

The object of the present invention is to provide an improved fluid bed method and apparatus.

In accordance with one aspect of the present invention, a solid waste disposal method and apparatus are provided incorporating lower and upper vertically spaced-apart perforate retention plates with at least a pair of first and second spaced-apart grates positioned therebetween to form an obstruction of labyrinth construction above the fluid bed. The grate bars of the first and second grates are staggered with respect to one another, forming a torturous path through the obstruction and preventing buildup therewithin of materials such as aluminum oxide which will clog and disrupt the effectiveness of the labyrinth obstruction.

In accordance with another aspect of the present invention, the bottom surface of at least the lower perforate plate immediately above the fluid bed of the construction of the last aforementioned feature is stepped between at least two horizontal surface locations to prevent the buildup of strips of material during operation of the fluid bed.

In accordance with still another aspect of the present invention, a solid waste disposal apparatus is provided including at least first and second obstructions of labyrinth construction positioned in the housing of a fluid bed reactor above the fluid bed and each provided with a return conduit or downcomer communicating with the top of that secondary bed/elutriation arrestor and passing down therethrough to a position within the fluid bed located therebelow.

These and other features and advantages will become more apparent upon a perusal of the following specification taken in conjunction with the accompanying drawings wherein similar characters of reference refer to similar structures in each of the several views.

FIG. 2 is an enlarged side-elevational view of a combustion housing constructed in accordance with the present invention with the waste material feed deleted for clarity.

FIG. 3 is an elevational, sectional view of a portion of the structure shown in FIG. 3, taken along line 3—3 in the direction of the arrows.

FIG. 4 is a horizontal, sectional view of a portion of the structure shown in FIG. 2 taken along line 4—4 in the direction of the arrows.

PREFERRED EMBODIMENT

Figure 1:
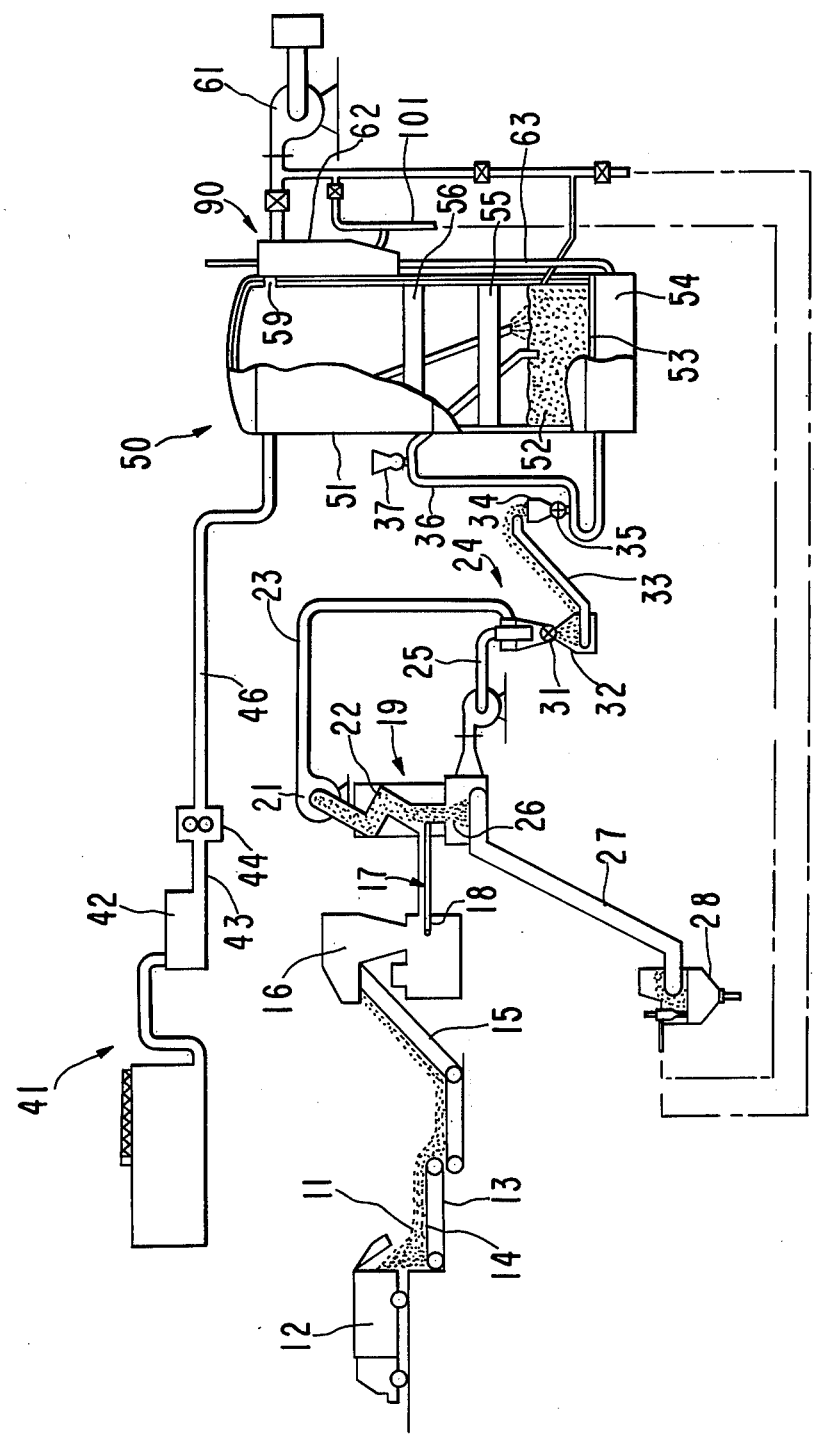
FIG. 1 is a side-elevational schematic view illustrating the present invention.

While the present invention is well suited for the pollution-free disposal of solid waste with the possible additional simultaneous disposal of various liquid materials, one configuration of the invention is useful in a municipal solid waste disposal plant wherein the solid waste can be used as a fuel to dispose of high water content municipal sewage sludge from a given population segment. Accordingly, the invention will be described with reference to such a system.

Referring now to the drawings with particular reference to FIG. 1, the combustion system includes three principal assemblies, first the waste delivery assembly 10 where solid waste material is collected, shredded and separated for introduction of the principal consumable portion into a combustion assembly, second the combustion assembly 50 wherein the solid waste is consumed and wherein the solid waste can also serve as a fuel to dispose of sewage sludge and third the combustion gas particle cleanup assembly 90 wherein entrained particles are removed from the combustion gases which are then either exhausted or conveyed on to perform work.

In the waste delivery system 10, solid waste 11 is received, typically in refuse or garbage collection trucks 12 which deliver the waste in either compacted or uncompacted form into a receiving pit 13 sized to act as a storage area so that the system can operate continuously while receiving solid waste only over a specified period of the day. From the pit 13 the waste 11 is delivered first by a pit conveyor 14 and then a shredder feed conveyor 15 into the top of a shredder 16 such as a belt-driven vertical, rotor, shredder grinder. The waste is gradually reduced in size and ejected into an exhaust chute 17 where it is conveyed with the aid of a conveyor 18 to an air classifier 19.

The effluent from the shredder 16 is a homogenoous mixture with particle size depending upon the shredder setting and the feed rate, varying from a very fine to 1 inch by 2 inch and larger. The steel and other ductile metal is in small balls with some coinage. Wood is toothpick to pencil size. The more flexible material, such as soft plastic and soft material such as rubber, are the largest particles.

High density, non-combustible particles coming out of the shredder 16 are removed from the process by the air classifier 19. This is done primarily to protect subsequent feed processes since the material removed has little heating value and hence would be little altered in volume or weight by the combustion process. Also, the air classifier provides a means for separating the reclaimable metal, glass, etc, for recycling to the appropriate industries for reuse if desired.

In the air classifier 19 a large blower 21 is used to suck the refuse up through an inclined treacherous path 22 and out through a tube 23 to a velocity reducer/solid waste accumulator system in the form of a cyclone inertial separator 24. The exhaust stack 25 of the inertial separator 24 containing the major portion of the air used during the air classifying cycle returns this air to the lower inlet of the air classifier 19.

The size of the heavy particles that are dropped out by the air classifier 19 can be regulated by adjustment of the velocity of air going through the system. The air classifier/solid waste feed subsystem is a completely enclosed system with the result that all odors, dust and potential pollution problems are completely contained.

The heavy non-combustible reject material 26 from the air classifier 19 is carried via a conveyor 27 to a residue storage bin 28 from which it can be disposed of periodically by land fill or ultimately by further reclamation of some or all of the materials contained in the residue.

The light particle fraction of the solid waste which has been carried from the air classifier 19 via conduit 23 to the inertial separator 24 drops preferably into a mulcher 31 which breaks apart any clods, chunks or large pieces that may have passed the shredder 16 or formed after shredding. This mulcher and mulching process eliminate possible clogging in pneumatic feed portions of the rest of the system.

From the mulcher 31 the solid waste drops into a storage accumulator 32 which serves as a reservoir to smooth out the flow of solid waste. From the storage bin 32 the solid waste is carried such as via a conveyor 33 into a hopper 34 for introduction into the entrance of an air-lock feed valve 35.

The air-lock feed valve 35 introduces the solid waste into a fluid conduit 36 where the material is pneumatically conveyed into the fluid bed to be described below.

A bed additive feed system 37 is provided for automatically feeding, upon demand, fresh limestone or other bed additive chemical reactive materials to the fluidized bed during operation. These additives react with the corrosive or other pollutant gases or materials within the bed and reduce or prevent noxious fumes from escaping to the atmosphere.

Where the combustion system also serves to consume liquid waste from a sewage treatment plant 41, sludge from sludge storage tanks 42 is removed via one or more pipes 43 to one or more sludge pumps 44 and via one or more pipes 45 to the combustion chamber where it is injected as a spray on top of the bed of granular material or injected above or below secondary beds in the combustion system.

It has been discovered that with the waste delivery assembly 10 the air volume reducing cyclone inertial separator 24 reduces the volume of air from the air classifier 19 to the air-lock feed valve 35 so that solid waste is fed through valve 35 with minimum turbulence and as dense as possible while the inertial separator 24 and storage bin 32 act as a plenum or reservoir to smooth out the flow of solid waste.

In the combustion assembly 50 a hollow, cylindrical combustion chamber 51 is provided to contain a bed of granular material 52 which, when not being fluidized, is supported on a distributor plate 53 which provides even distribution of air across the bottom of the bed from a plenum chamber 54 therebelow.

Positioned within the combustion housing 51 above the fluid bed 52 are a lower secondary bed/elutriation arrestor 55 and then upper secondary bed/elutriation arrestor 56 constructed in a manner described in greater detail below, each to provide an obstruction of labyrinth construction.

A return conduit or downcomer 57 is provided open at the top of the lower arrestor 55 and extending through the lower arrestor 55 to a position below the surface of the bed of granular material 52. A second return conduit or downcomer 58 is provided open at the top of the upper arrestor 56 and extending through the second and first arrestors 55 and 56 to a position below the surface of the bed of granular material 52.

Exhaust gases from the combustion chamber 51 are conveyed out of a number of exhaust ports 59 below a cover over the top of chamber 51 and passed through the gas particle cleanup assembly typically incorporating inertial separators for separation and return of granular material carried out of the bed with the exhaust gases for later return to the bed.

Combustion air is directed to the combustion chamber from a blower 61, through a housing 62 surrounding the inertial separators for heat exchange to heat up the blower air and delivery via a conduit 63 to the plenum 54.

When burning or consuming more volatile, difficult to oxidize or thermally break down liquid or solid waste materials in a fluid bed without the present invention, afterburning, unburned hydrocarbons, incomplete thermal breakdown of toxic materials, and the like can occur. The addition of multiple secondary bed/elutriation arrestors, each forming an obstruction of labyrinth construction reduce or eliminate these more difficult combustion problems. The secondary bed/elutriation arrestors 55 and 56 are mounted in the housing 51 in a horizontal plane or at a slight angle with the downcomers 57 and 58. Other secondary bed/elutriation arrestors may be added above arrestor 56 with a downcomer or return conduit penetrating to within a short distance of the distribution plate 53.

It has been discovered that different configurations of the secondary bed/elutriation arrestors result in different performances in the disposal of various solid wastes.

One of the more difficult materials to burn in a fluid bed arrestor is aluminum-laden solid waste with the aluminum in the form of aluminum foil, flip-top can lids and the like. During combustion of this type of material, molten nodules of aluminum are formed and upon impact with one another will oxidize resulting in slagging, clinkering and ash buildup. The addition of the secondary bed/elutriation arrestor provides a means of breaking apart these nodules as they flow through the labyrinth obstruction, depending upon the configuration of the obstruction. It has been found during tests that a labyrinth obstruction in the form of a plurality of large spheres such as of ceramic positioned between a pair of spaced apart perforate plates results in aluminum oxide buildup and consequent unacceptable use when burning aluminum-laden solid waste.

The particular configuration of the preferred labyrinth obstruction in accordance with the present invention is illustrated in FIGS. 2–4. As illustrated there, the secondary bed/elutriation arrestor includes the lower and upper vertically spaced apart perforate retention plates 71 and 72. These plates include a series of parallel bars 73 spaced apart to provide spaces 74 between the bars for passage of the gases moving upwardly in the combustion chamber. Between the retention plates 71 and 72 at least first and second vertically spaced-apart grates 75 and 76 are spaced apart from each other and from the retention plates 71 and 72 by spacer bars 77 extending transversely thereof.

Each of the first and second grates 75 and 76 include a plurality of spaced-apart grate bars, the bars 81 of the lower grate 75 being spaced apart by spaces 82 and the bars 83 of the upper grate 76, being spaced apart by spaces 84. The bars 81 and 83 of the grates 75 and 76 respectively are staggered with respect to one another so that the grate bars 83 of the upper grate 76 are positioned above the spacings 82 between the bars 81 of the lower grate 75. Similarly, the bars 81 of the lower grate 77 are positioned below the spaces 84 between the bars 83 of the upper grate. These spaced-apart bars have been found to effectively prevent the buildup of aluminum oxide in the obstruction of labyrinth construction so that strips of aluminum oxide which begin to form are broken up and eventually reduced to bed material size particles. It has been found additionally advantageous to prevent the buildup of aluminum oxide strips on the lower surface of the lower perforate retention plate by stepping this lower surface between at least two horizontal surface locations such as shown in FIGS. 2 and 3 wherein the lower surface of retention plate 71 contains surface segments 85 in one horizontal plane and stepped from surfaces 86 in another horizontal plane by vertical steps 87. It has been discovered that any aluminum oxide that begins to build up on lower surfaces of a perforate retention plate of the latter configuration will flake off in small pieces and not lodge within the secondary bed/elutriation arrestor.

The fluidizing air is caused to flow through the bed material particles under carefully controlled conditions, chief among these conditions being the requirement that the air velocity through the bed, and hence the pressure drop, be greater than the value required to support the bed weight and less than the value required to sweep the particles out of the bed. In addition, the bed must consist of particles within a suitable range of size, shape and density. When these conditions are all satisfied, the stationary bed of particles will have expanded and the bed particles will exist in a fluidized state. If the movement of one specific particle could be observed, it would be seen to undergo a continuous, turbulent motion and would wander throughout the bed in a random manner. Viewed as a whole, the dynamic condition of the fluidized bed resembles a tank of boiling water in the sense that there is considerable turbulence and bursting of bubbles at the surface. It is this dynamic characteristic which imparts to a fluidized bed its unique advantages.

The inert or chemically reactive bed materials used with the fluid bed combustor are chosen to withstand the combustion temperatures without melting or slagging. The specific bed materials selected can fall within a wide variety of inert particles, ranging from the inexpensive silica "beach" sand to the more exotic ceramic materials (usually alumina or silicon carbide) and to chemically reactive materials such as ground limestone, dolomite, and others. The bed material is preheated to a predetermined temperature and then fluidized for injection and combustion of the solid waste material.

The cross-sectional area of the downcomers 57 and 58, the angle of the support plates 71 and 72, the thickness, configuration and size of the openings in the support plates 71 and 72, the configuration of the labyrinth obstruction established by the grates 75 and 76, and the height relationship of the secondary bed/elutriation arrestor assemblies 55 and 56 and their relationship to one another are all chosen in the particular application to provide and maintain a shallow bed of fluidizing material on top of the secondary bed/elutriation arrestors 55 and 56. These shallow bed depths, along with the labyrinth obstruction in the arrestors 55 and 56 whose voids are filled with small particles during fluidization of the granular bed 52, provides a very even flow of gases through the plurality of arrestors 55 and 56, and the action of the small particles filling the voids in the labyrinth obstructions allows each arrestor 55 and 56 to prevent large bubble formations and the associated elutriation from the top surface of the primary bed and excess elutriation from the top surface of the lower arrestor 55. Each arrestor 55 and 56 acts as a separate turbulence generator providing additional and more thorough mixing of air and fuel and provides additional high heat transfer zones for complete oxidation, decomposition, destruction, etc., of the products being consumed in the system.

What is claimed is:

1. In a waste disposal apparatus for consuming waste with minimal residue and a substantially pollution free gaseous output including a combustion housing, a bed of granular material, means for supporting the bed of granular material within the housing, means for providing combustion air to the bottom of the bed for maintaining the granular material in a fluidized state and an obstruction of labyrinth construction positioned within the housing above the bed, the improvement in the labyrinth construction comprising:

lower and upper vertically spaced-apart perforate retention plates, at least first and second vertically spaced-apart grates positioned between said lower and upper plates, means spacing said first and second grates from each other and from said lower and upper plates, each of said first and second grates including a plurality of spaced-apart grate bars, the grate bars of the upper of said grates positioned above the spacing between the grate bars of the lower of said grates.

2. The apparatus of claim 1 wherein
each of said lower and upper perforate plates includes a plurality of spaced-apart bars aligned parallel with the grate bars of said grates.

3. The apparatus of claim 2 wherein
the lower surface of the bars of the lower perforate plate is stepped between at least two horizontal surface locations.

4. In a waste disposal apparatus for consuming waste with minimal residue and a substantially pollution-free gaseous output including a combustion housing, a bed of granular material, means for supporting the bed of granular material within the housing, and means for providing combustion air to the bottom of the bed for maintaining the granular material in a fluidized state, the improvement comprising:

a first obstruction of labyrinth construction positioned in said housing above said bed, conduit means open at the top of said first obstruction means and extending through said first obstruction to a position below the surface of the bed of granular material, a second obstruction of labyrinth construction positioned in said housing above said first obstruction, and conduit means open at the top of said second obstruction and extending through said second and said first obstructions to a potition below the surface of the bed of granular material.

5. Method of consuming waste material with minimal residue and a substantially pollution-free gaseous output comprising the steps of:
introducing waste material into a heated, fluidized bed of granular material,
obstructing upward movement of the granular material and waste at a first location above the fluid bed by an obstruction of labyrinth construction which permits torturous movement of granular material therethrough,
returning into the fluid bed granular material which passes the stage of first obstruction,
obstructing upward movement of the granular material and waste at a second location above the fluid bed and above the location of the first obstruction stage by an obstruction of labyrinth construction which permits torturous movement of granular material therethrough, and
returning into the fluid bed granular material which passes the stage of second obstruction.

* * * * *